INVENTORS
LEON F. ROBERTSON
JAMES W. THOMAS
BY
Christel & Bean
ATTORNEYS

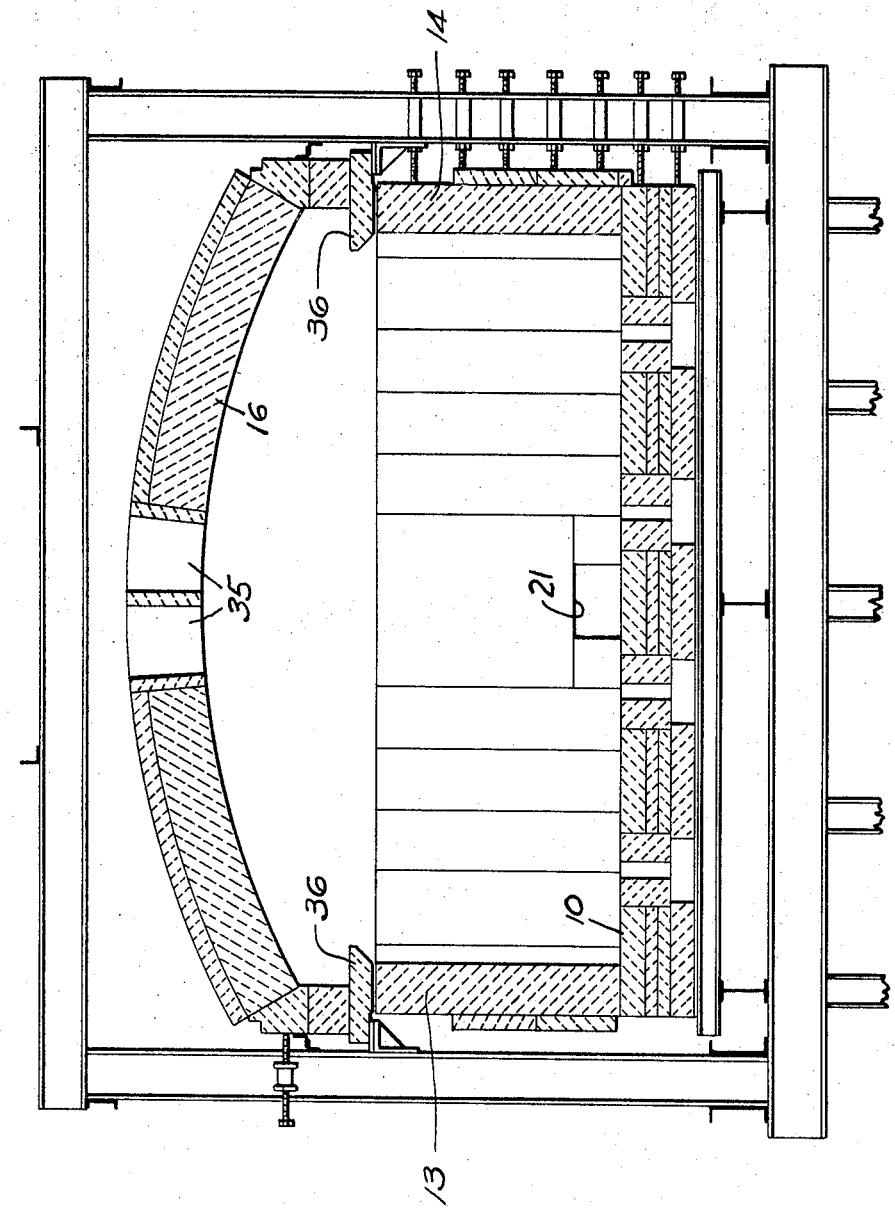

United States Patent Office 3,574,585
Patented Apr. 13, 1971

3,574,585
ELECTRIC GLASS MELTING FURNACE AND METHOD OF MELTING GLASS
Leon F. Robertson and James W. Thomas, Brockport, Pa., assignors to Brockway Glass Company, Inc., Brockway, Pa.
Filed Aug. 19, 1968, Ser. No. 753,360
Int. Cl. C03b 5/02
U.S. Cl. 65—135            10 Claims

ABSTRACT OF THE DISCLOSURE

A continuous tank furnace having a batch feeding and an opposite glass discharge end with submerged electrodes for supplying heat to melt the batch constituents. The space above the level of the melt in the tank is divided into at least two successive zones by a hanging transverse refractory wall which extends downwardly close to the surface of the melt. Independently controlled auxiliary heaters above the surfaces of the melt in the two zones provide means for controlling the existence of and the density or thickness of the batch cover on the glass melt. This maintains a substantial batch cover in the first zone to retain heat within the melt while auxiliary heat above the melt in the second zone minimizes the blanketing or insulating effect of the batch cover and thus promotes liberation or gases which would otherwise form undesirable seeds and/or blisters in the molten glass.

BACKGROUND OF THE INVENTION

This invention relates to glass melting furnaces and particularly to continuous tank furnaces wherein glass batch material is introduced at one end and molten glass is withdrawn from the opposite end and wherein the heat energy for melting is derived principally from submerged electrodes.

Glass melting furnaces employing Joule effect heating are known in the glass manufacturing art but generally speaking, questions of economy and efficiency, as compared with combustion furnaces fired by fuel gas or fuel oil, have deterred widespread use of electrical heating for glass melting furnaces.

In electrically heated furnaces employing submerged electrodes economy of operation dictates the desirability of retaining heat within the melt. This retention of heat is promoted by establishing operating conditions which maintain a batch cover on the surface of the molten glass. Opposed to this is the desirability of keeping the top of the melt fluid, thus liberating gases from the surface of the melt to minimize seeds.

SUMMARY OF THE INVENTION

The present invention provides a continuous tank furnace having a batch feeding end and an opposite glass discharge end with submerged electrodes distributed throughout the tank for supplying the principal heat required for melting the batch constituents to form molten glass. The space above the normal level of the melt in the tank is divided into at least two zones by a hanging refractory wall which extends downwardly close to the surface of the melt. This wall extends transversely of the furnace between adjacent transverse rows of electrodes, whereby one of the two chambers above the melt is adjacent to the charging end of the furnace and the other is adjacent to the discharge end.

Independently controlled auxiliary heaters above the surfaces of the melt in the two chambers provide means for controlling the existence of and the density or thickness of the layer or batch on the glass melt. By this means a substantial insulatory layer of batch may be maintained in the first zone for conserving heat while auxiliary heat above the melt in the second zone minimizes the blanketing effect of the batch layer and creates a hot top and thus promotes liberation of gases which would otherwise form undesirable seeds and/or blisters in the molten glass.

A further refractory wall may be placed downstream with respect to the two melting zones mentioned above between the melting and fining zones and the working chamber, to prevent batch from being drawn to the working end when glass is drawn from the surface.

BRIEF DESCRIPTION OF THE DRAWINGS

FIG. 3 is a cross-sectional view taken approximately on the line III—III of FIG. 1.

DESCRIPTION OF THE PREFERRED EMBODIMENT

The glass melting furnace of the present invention is of the continuous tank type wherein batch materials are fed into the tank by way of a doghouse at one end thereof and molten glass is withdrawn from the other end. Heat energy for melting the batch materials to form molten glass is provided primarily by electrical energy introduced to the glass batch by submerged electrodes.

Figure 1:
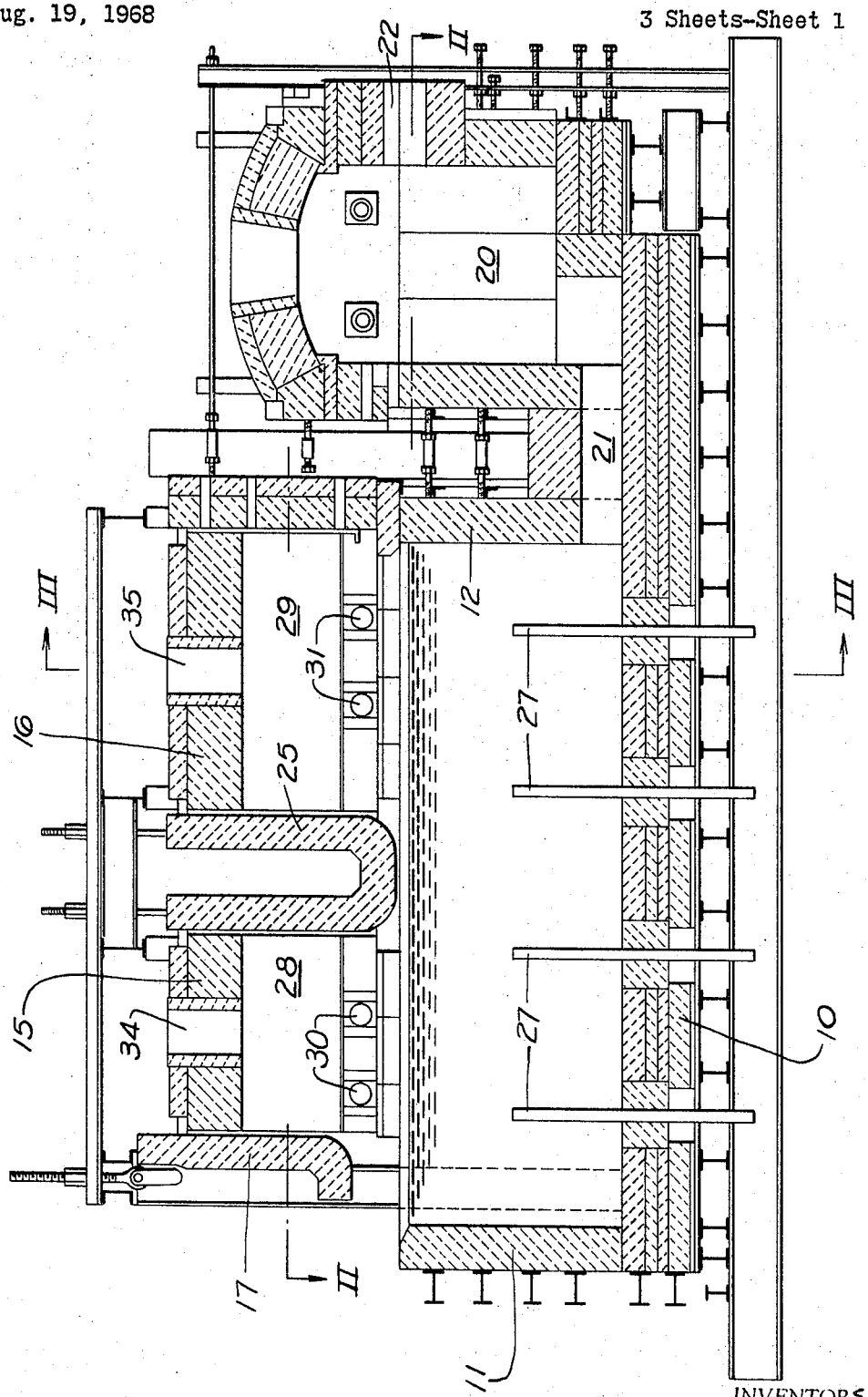
FIG. 1 is a longitudinal cross-sectional view through one form of glass melting furnace constructed in accordance with the present invention.

FIG. 1 shows a representative melting tank comprising a refractory bottom wall 10, end walls 11 and 12, side walls 13 and 14, and top wall sections 15 and 16. Batch material is introduced at end wall 11 and for this purpose a wall section 17 above end wall 11 is set inwardly to provide an opening for charging raw batch material into the tank.

A working chamber 20 communicates with the melting tank proper by way of a submerged throat 21 which leads from the lower portion of end wall 12. As will be seen from FIG. 2, working chamber 20 has two outlets 22 and 23 for flow of molten glass to conventional feeders such as are employed in container manufacture and other glass fabricating processes. Any desired number or arrangement of feeders or outlets from the working chamber may be employed.

An important feature of the glass melting furnace of the present invention is a hanging refractory wall 25 which is disposed between the roof sections 15 and 16 and extends downwardly fairly close to the normal surface level of the melt. The cooperation of hanging wall 25 with the primary electrical heating means and supplementary heating means is the gist of the present invention.

Figure 2:
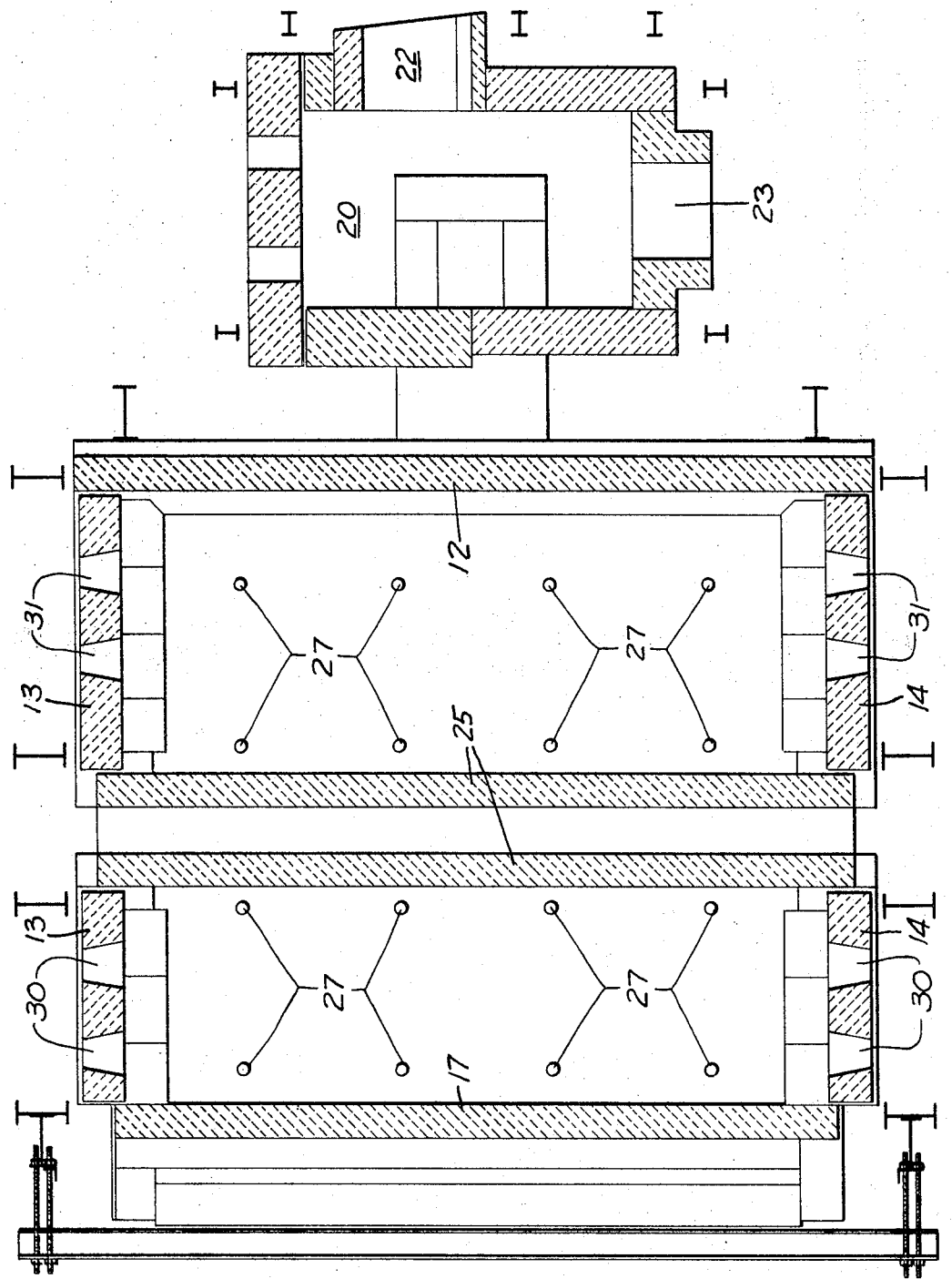
FIG. 2 is a cross-sectional view taken generally on the line II—II of FIG. 1.

The use of submerged electrodes in glass melting furnaces is in and of itself well known and the furnace illustrated in the drawings and now being described by way of example includes a plurality of electrodes 27 distributed as clearly shown in FIG. 2. The electrodes 27 are connected in a conventional manner to electrical circuitry whereby the useful heat comprises primarily Joule effect heat produced by current flow through the melt between the electrodes, there being secondary heat resulting from radiation of heat from the electrodes to the molten glass. In any event, the liberation of heat from the electrodes is entirely within the molten glass body.

It will be noted that hanging wall 25 in effect forms two successive chambers 28 and 29 which overlie the glass melt.

A plurality of combustion burner openings 30 communicates with chamber 28 above the glass melt at the charging end of the melting tank and a further set of combustion burner openings 31 communicates with chamber 29 above the melt at the discharge end of the tank.

The combustion heating ports 30 are used only in start-up operation since during the normal operation of the furnace it is desired that a blanket of batch material or partly melted material shall blanket the melt and conserve heat therein. A vent stack 34 is open only when the burners of ports 30 are in operation.

The burners of ports 31 are used continuously and act chiefly to balance the heat which would otherwise be lost from the top of the melt by radiation and convection, thus tending to keep the batch cover soft to permit liberation of gases in the form of bubbles and also to reduce thermal shock on the refractory roof. It is to be understood that in the normal progressive melting of the material passing through the furnace the batch cover will normally be much thinner and softer to the right of hanging wall 25 than to the left thereof. This supplementary heating by way of ports 31 likewise tends to eliminate crust which may otherwise collect on the side walls immediately above the melt when the level of the melt recedes or ebbs.

A vent 35 is likewise provided, the opening of which is adjusted to control pressure over the melt when the burners of ports 31 are in operation. It will be noted that hanging wall 25 is U-shaped in cross-section as viewed in FIG. 1 and, if desired, this configuration may be employed to facilitate air cooling of wall 25.

It will be noted from FIG. 3 that longitudinal sill members 36 slightly overlie the glass melt. These sill members tend to retard liberation of heat upwardly from the melt along the side walls and thus tend to counteract the slightly lower temperatures which normally prevail adjacent to the side walls due to conduction of heat from the melt to such walls. These sills perform the same function as in certain prior art gas-fired glass melting tank furnaces.

In addition to the advantages recited earlier herein, the furnace of the present invention and the glass melting method disclosed herein provide advantages in the control of the color of glass produced in such furnace and according to the method set forth. As an example of these advantages, reference will be had to the production of glass having green or other coloration and the control of ultraviolet transmission characteristics of the glass.

It is known that trivalent chrome has a high transmission in the ultraviolet range while hexavalent chrome absorbs ultraviolet rays and therefore has a low transmission in this range. The chrome added to the batch is in the hexavalent state but at melting temperature the hexavalent chrome will tend to be reduced. Consequently, the more rapidly the batch is melted and fined and moved through the furnace the less time there will be for such reduction to trivalent chrome.

Raising the temperature above the melt in the second zone, that is in the chamber 29, raises the temperature of the upper level of the glass in this zone and accordingly raises the level of the current path between the electrodes in the glass and also, as described previously, decreases the thickness of the batch cover in this zone. Both of these conditions act to reduce the residence time of any increment of batch in the batch cover and in the glass melt. This decreased time appears to reduce the amount of chrome which is reduced from the hexavalent to the trivalent state, which shows up in the resultant glass as a lower transmission in the ultraviolet region of the spectrum.

For this and other purposes, the temperature in the chamber above the second zone, what is referred to in the art as the front melter zone, will generally be maintained at a temperature approaching the temperature of the molten glass. By way of example, the temperature of the enclosure above the front melter zone may be in the neighborhood of 2100° F. as compared with a molten glass temperature of approximately 2700° F.

The principle of the two melting zones shown and claimed herein may be employed with a further hanging wall downstream of the second melting zone, as for instance in larger electric melting furnaces and in furnaces for the manufacture of flat glass wherein a further hanging wall is employed in place of the bridge wall and submerged throat of the furnace illustrated by way of example in the accompanying drawings.

It is to be understood that the principles of the invention are not limited to the specific embodiment illustrated and described herein and is intended to include the foregoing modifications and other variations which may be made without departing from the spirit of the present invention and the scope of the appended claims.

We claim:

1. A continuous glass melting furnace comprising a melting tank having a batch receiving end and a discharge end, Joule effect electrodes projecting into the melt in said tank in both the batch receiving end and the discharge end and comprising the principal source of heat energy for melting batch materials therein, a wall above said melt extending transversely with respect to the flow of glass from the batch end to the discharge end and extending downwardly to but above the level of the melt to divide the space within said tank above said melt into a receiving end chamber and a discharge end chamber overlying said melt, and means for independently applying heat to said discharge end chamber above the melt for maintaining above said melt at the part of said tank adjacent to the discharge end a temperature of the general order of the melting temperature of the glass.

2. A glass melting furnace according to claim 1 wherein said discharge end chamber heating means comprises combustion heat ports entering said chamber.

3. A glass melting furnace according to claim 1 having selectively operable means for heating said receiving end chamber.

4. A glass melting furnace according to claim 1 wherein said electrodes are distributed so as to heat the melt substantially uniformly throughout said melting tank.

5. A glass melting furnace according to claim 2 wherein said electrodes are distributed so as to heat the melt uniformly throughout said melting tank.

6. A method of melting glass batch constituents to form molten glass which comprises introducing batch materials into one end of a continuous tank furnace having submerged Joule effect electrodes for continuously heating the melt therein and a transverse wall above the melt to divide the space above the melt into at least two compartments, one adjacent to the batch introduction end and the other adjacent to the molten glass discharge end, heating the melt in both compartments by submerged Joule effect electrodes, continuously withdrawing molten glass from the opposite end of said tank, maintaining the space above the melt at the batch feeding side of said transverse wall at a relatively low temperature as determined by the insulating effect of floating batch material which is of maximum density and depth at such feeding side, and applying extraneous heat at the other side of said transverse wall above the melt sufficient to convert the batch layer to a substantially fluid condition while supplying Joule effect heat within the batch at said other side of said transverse wall to cause the upper portions of the melt at said other side of said wall to have a substantially higher temperature due to such extraneous heat.

7. The method according to claim 6 wherein said extraneous heat maintains the space above the melt at a temperature of the general order of the melting temperature of the glass.

8. The method according to claim 6 wherein heat is supplied substantially uniformly throughout the melt by said submerged electrodes.

9. The method according to claim 8 wherein said electrodes have a penetration ratio of aproximately 1 to 2 with respect to the depth of the glass 10.

10. The method according to claim 6 wherein batch material is fed continuously along the entire width of the tank whereby continuous movement of batch material over the tops of the several electrodes avoids excessive heating and burning through of the batch at such electrode tops where the heat is of greatest concentration.

References Cited

UNITED STATES PATENTS

| 2,122,469 | 7/1938 | Hitner | 13—6 |
| 2,512,761 | 6/1950 | Arbeit | 65—136 |
| 2,975,555 | 3/1961 | Zellers, Jr., et al. | 65—134X |

ARTHUR D. KELLOGG, Primary Examiner

U.S. Cl. X.R.

65—136, 335, 337, 342